(12) United States Patent
Kin et al.

(10) Patent No.: US 6,865,456 B2
(45) Date of Patent: Mar. 8, 2005

(54) UNDERINFLATION DETECTOR

(75) Inventors: Keiyu Kin, Saitama (JP); Osamu Yano, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/688,244

(22) Filed: Oct. 17, 2003

(65) Prior Publication Data

US 2004/0111198 A1 Jun. 10, 2004

(30) Foreign Application Priority Data

Oct. 29, 2002 (JP) ......................................... 2002-313991

(51) Int. Cl.[7] ............................. G06F 7/00; G06F 19/00
(52) U.S. Cl. ........................... 701/29; 701/30; 701/41; 701/81; 701/93; 340/441; 340/444
(58) Field of Search ............................. 701/29, 30, 41, 701/81, 93; 340/441, 442, 444

(56) References Cited

U.S. PATENT DOCUMENTS 4,825,368 A * 4/1989 Itoh et al. ...................... 701/69
5,409,302 A * 4/1995 Chabbert ...................... 303/112
6,313,742 B1 * 11/2001 Larson ......................... 340/442
6,426,694 B1 * 7/2002 Larson ......................... 340/441

FOREIGN PATENT DOCUMENTS

| JP | 49-85701 | 8/1974 |
| JP | 06-092114 | 4/1994 |

* cited by examiner

Primary Examiner—Gertrude A. Jeanglaude
(74) Attorney, Agent, or Firm—Fish & Richardson P.C.

(57) ABSTRACT

A rotational speed V1 of a left front wheel T1, a rotational speed V2 of a right front wheel T2, a rotational speed V3 of a left rear wheel T3, and a rotational speed V4 of a right rear wheel T4 are detected by rotational speed sensors S1–S4, respectively. A front-wheel yaw rate γF arising due to a rotational speed difference between the front wheels T1, T2 and a rear-wheel yaw rate γR arising due to a rotational speed difference between the rear wheels T3, T4 are monitored. When a significant disparity between the both rotational speed differences is observed, it is determined that tire inflation pressure of any of the wheels T1–T4 has decreased. Upon detection, correction is made to an apparent yaw rate that would be observed in the properly inflated wheel as a result of steering for correction by a driver, thereby improving detection accuracy of underinflation of the tires.

6 Claims, 7 Drawing Sheets

FIG.4

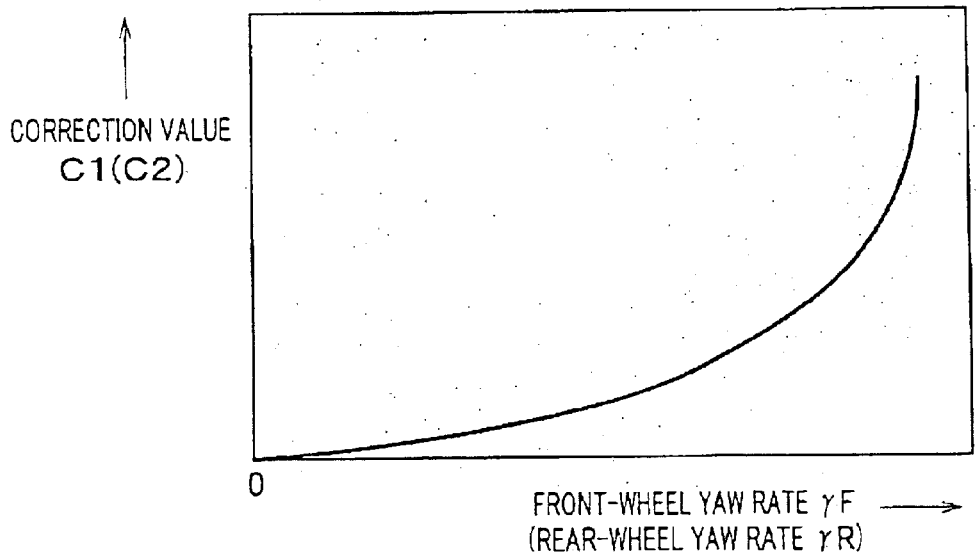

FIG.5

|  |  |  | FRONT-WHEEL YAW RATE $\gamma F$ | REAR-WHEEL YAW RATE $\gamma R$ |
|---|---|---|---|---|
| MAP RETRIEVAL WITH FRONT-WHEEL YAW RATE $\gamma F$ | a1 | CORRECTION TO FRONT WHEELS T1,T2 | $\gamma F = \gamma F \times C1$ | $\gamma R = \gamma R$ |
|  | b1 | CORRECTION TO REAR WHEELS T3,T4 | $\gamma F = \gamma F$ | $\gamma R = \gamma R / C1$ |
| MAP RETRIEVAL WITH REAR-WHEEL YAW RATE $\gamma R$ | c1 | CORRECTION TO FRONT WHEELS T1,T2 | $\gamma F = \gamma F / C2$ | $\gamma R = \gamma R$ |
|  | d1 | CORRECTION TO REAR WHEELS T3,T4 | $\gamma F = \gamma F$ | $\gamma R = \gamma R \times C2$ |

FIG. 7

|  |  |  | FRONT-WHEEL YAW RATE $\gamma F$ | REAR-WHEEL YAW RATE $\gamma R$ |
|---|---|---|---|---|
| CALCULATION OF FRONT-WHEEL YAW RATE DEVIATION $\gamma P1$ | a2 | CORRECTION TO FRONT WHEELS T1,T2 | $\gamma F = \gamma F - \gamma P1$ | $\gamma R = \gamma R$ |
|  | b2 | CORRECTION TO REAR WHEELS T3,T4 | $\gamma F = \gamma F$ | $\gamma R = \gamma R + \gamma P1$ |
| CALCULATION OF REAR-WHEEL YAW RATE DEVIATION $\gamma P2$ | c2 | CORRECTION TO FRONT WHEELS T1,T2 | $\gamma F = \gamma F + \gamma P2$ | $\gamma R = \gamma R$ |
|  | d2 | CORRECTION TO REAR WHEELS T3,T4 | $\gamma F = \gamma F$ | $\gamma R = \gamma R - \gamma P2$ |

UNDERINFLATION DETECTOR

BACKGROUND OF THE INVENTION

This invention relates to an underinflation detector that detects insufficient inflation pressure of tires of a vehicle.

In order to achieve stable driving of a vehicle, a variety of systems for detecting loss or insufficiency of inflation pressure of tires have been developed. Typically, these systems fall roughly into two approaches: one that detects inflation pressure directly by a pressure sensor attached to each wheel; and the other that determines change in inflation pressure from a difference in rotational speeds of tires by making use of outside diameters of the tires which changes in accordance with change in the inflation pressure. The latter approach that determines change in inflation pressure from differences in rotational speeds of the tires has an advantage that a rotational speed sensor attached to each wheel for the antilock brake system or the like in ordinary vehicles can be used to construct the system.

Among techniques for detecting insufficiency of inflation pressure through the latter approach in which difference in rotational speeds of the tires is utilized is, for example, a method adopted by an apparatus disclosed in JP 49-85701 A in which the sum of the numbers of revolutions per unit time of the left front wheel and the right rear wheel is calculated, the sum of the numbers of revolutions per unit time of the right front wheel and the left rear wheel is calculated, and the sums of the numbers of revolutions per unit time as thus calculated are compared. This apparatus can accordingly achieve improved accuracy of detection by offsetting the difference in the numbers of revolutions per unit time between the right wheel and the left wheel which arises while a vehicle makes a turn in a curved road, and the difference in the numbers of revolutions per unit time between the front wheel and the rear wheel which is derived from the difference between the driving wheel and the wheel driven by the driving wheel.

Another technique for detecting insufficiency of inflation pressure through the approach in which difference in rotational speeds of the tires is utilized is disclosed in JP 6-92114 A, in which a control unit is programmed so as not to detect the difference in the rotational speeds of the tires in transient states of behavior of the vehicle, for example, where the vehicle drives at a very low speed, or the speed of the vehicle increases or decreases suddenly, or the vehicle undergoes a great lateral acceleration. Thus-configured apparatus can accordingly prevent a possible error in detection, thereby increasing reliability.

However, when tire inflation pressure of one of front wheels decreases, for example, during constant-speed straight-ahead driving of a vehicle, a rotational speed of the wheel increases in accordance with the reduction of an outside diameter thereof. On, the other hand, the contact area of the wheel with the road increases accordingly; thus, the rolling resistance thereof increases as well. When the rolling resistances of two front wheels connected by one and the same axle shaft are different from each other, a difference occurs between forces acting on each front wheel, with the result that a very small yaw rate is observed in the front wheels. It is likely, in such an instance, that a driver would steer so as to cancel the yaw rate irrespective of whether or not the driver intends to do so (steering for correction). Thus, a yaw rate in a direction opposite thereto so as to cancel the front wheel yaw rate would be observed in the rear wheels. Consequently, a difference in rotational speed which results from cornering of the vehicle arises between the rear wheels of which tires have not been underinflated, and thus a disparity between the front-wheel rotational speed difference and the rear-wheel rotational speed difference is reduced apparently on calculation. The conventional techniques for detecting insufficiency of inflation pressure have given no consideration to such influence of steering for correction made almost unconsciously by the driver as described above, and could thus fail to detect the insufficiency of inflation pressure in some instances as above. Therefore, the present invention has been made to address the above disadvantages, and it is an exemplary general object of the present invention to provide an underinflation detector that can detect insufficient inflation pressure of tires with improved reliability.

SUMMARY OF THE INVENTION

An underinflation detector for a four-wheeled vehicle provided according to one aspect of the present invention includes: a rotational speed sensor that detects rotational speeds of two front wheels and two rear wheels of the vehicle; and a controller that determines that inflation pressure of a tire of any of the wheels has decreased, if a parameter calculated from outputs of the rotational speed sensor exceeds a threshold. A first value of the parameter is calculated using a disparity between a front-wheel rotational speed difference and a rear-wheel rotational speed difference; and correction is made to the first value of the parameter to obtain a second value of the parameter to be compared with the threshold by canceling a deviation of one of the front-wheel rotational speed difference and the rear-wheel rotational speed difference caused by a steering operation which a driver performs so as to cancel the other of the front-wheel rotational speed difference and the rear-wheel rotational speed difference arising due to underinflation of the tire.

The above inflation detector is configured to make a comparison between a front-wheel rotational speed difference (difference between rotational speeds of right and left front wheels) and a rear-wheel rotational speed difference (difference between rotational speeds of right and left rear wheels), to determine whether or not the tire inflation pressure of any of the wheels of the vehicle has decreased. The determination comes after correction made to adjust the difference between the rotational speeds. As will be described below, the correction is made to a value derived from either of the front-wheel rotational speed difference or the rear-wheel rotational speed difference. When tire inflation pressure of a wheel decreases, a difference between rotational speeds is observed, and the amount of steering for correction by a driver can be evaluated from the difference. Correction equivalent to thus-evaluated steering for correction is subjected to either of the front-wheel rotational speed difference or the rear-wheel rotational speed difference, so that the effect of steering for correction by the driver can be eliminated.

In the above underinflation detector, the correction to the first value of the parameter may be made by retrieving a correction value from a map with a yaw rate calculated from the rotational speed difference arising due to the underinflation of the tire, and multiplying the yaw rate by the correction value. Moreover, the correction to the first value of the parameter may be made by retrieving a correction value from a map with a first yaw rate calculated from the rotational speed difference arising due to the underinflation of the tire, and dividing a second yaw rate calculated from the rotational speed difference caused by the steering operation by the correction value. The above underinflation detectors are adapted to correct the first value of the parameter using a map (or a table, etc.) calculated and stored in advance. The yaw rate (first and second yaw rates) may be obtained by multiplying the rotational speed difference(s) by a predetermined coefficient, and the yaw rate for the front wheels and the yaw rate for the rear wheels are used as search criteria for searching the map or table.

Alternatively, the correction to the first value of the parameter may be made by calculating a yaw moment acting on one of a front axle shaft and a rear axle shaft with an increase of a rolling resistance arising due to the underinflation of the tire, obtaining from the yaw moment a yaw rate deviation corresponding to the increase of the rolling resistance, and subtracting the yaw rate deviation from a yaw rate calculated from the rotational speed difference arising due to the underinflation of the tire or adding the yaw rate deviation to a yaw rate calculated from the rotational speed difference caused by the steering operation. The above underinflation detector is adapted to correct the first value of the parameter through arithmetic operations using constants prepared in advance or measured values. The above yaw rates may be obtained by multiplying the front-wheel and rear-wheel rotational speed differences by a predetermined coefficient.

In the above underinflation detector, a wheel diameter ratio may be calculated from the first value of the parameter to which the correction has been made; and the second value of the parameter to be compared with the threshold may be obtained by multiplying the wheel diameter ratio by normalized values of indicators of straight-ahead driving of the vehicle, and taking moving averages thereof. The indicators of straight-ahead driving of the vehicle are normalized and used to weight the wheel diameter ratios, and thus-weighted wheel diameter ratios are moving-averaged to produce a preferable determination result. Since there is a specific relationship among tire inflation pressures, diameters and rotational speeds of the wheels, the diameter ratio may be obtained by dividing a disparity between the front-wheel rotational speed difference and the rear-wheel rotational speed difference by the vehicle speed. In a case where the vehicle is cornering, or others, there is a high probability that a difference should arise between rotational speeds of the right and left wheels; thus, the diameter ratio calculated in such a case is weighted, and then the moving averages of the weighted diameter ratios are taken, so as to reduce the degree of contribution thereof to the determination of significant decrease in inflation pressure of tires. Consequently, only the difference between the rotational speeds of the wheels caused by the decrease in inflation pressure of tires during straight-ahead driving of the vehicle is relied on in detecting insufficiency of inflation pressure of the tires.

Other advantages and further features of the present invention will become readily apparent from the following description of preferred embodiments with reference to accompanying drawings.

BRIEF DESCRIPTION OF THE DRAWINGS

FIG. 4 is a diagram illustrating one example of maps usable for correction.

FIG. 5 is a table illustrating an operation for correction according to a first embodiment of the present invention.

FIG. 7 is a table illustrating an operation for correction according to a second embodiment of the present invention.

DETAILED DESCRIPTION OF THE PREFERRED EMBODIMENTS

Figure 1:
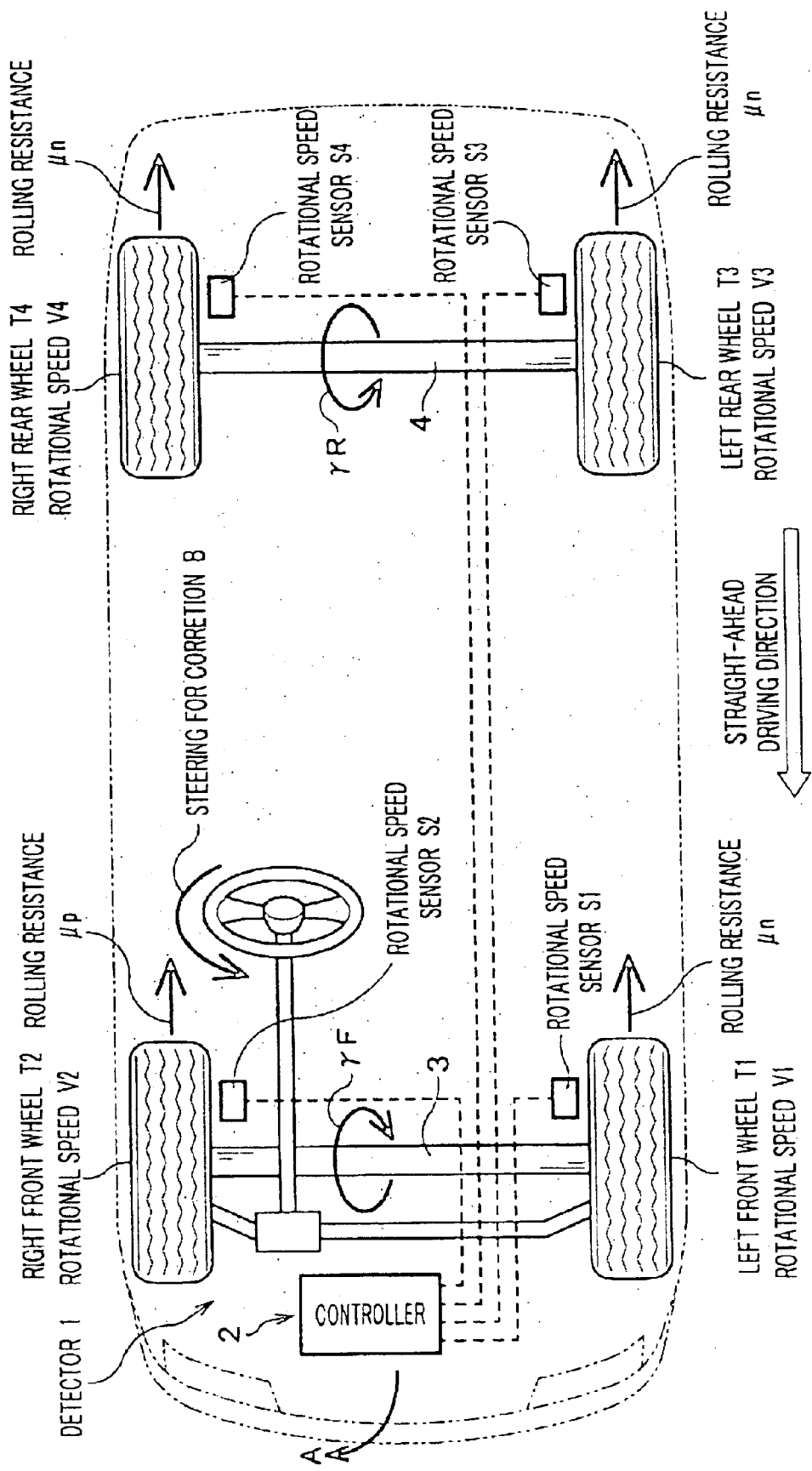
FIG. 1 is a schematic diagram illustrating an arrangement and operation of an underinflation detector according to one exemplified embodiment of the present invention.

First, a description will be given of an outline of determination of insufficiency of inflation pressure of tires of a vehicle adopted in an underinflation detector 1 according to one exemplified embodiment of the present invention with reference to FIG. 1. The vehicle is provided with four wheels T1–T4. The left front wheel T1 and the right front wheel T2 are connected with each other by an axle shaft 3, and the left rear wheel T3 and the right rear wheel T4 are connected with each other by an axle shaft 4. Rotational speed sensors S1–S4 are provided in the vehicle near the left front wheel T1, the right front wheel T2, the left rear wheel T3 and the right rear wheel T4, respectively, to detect the rotational speeds V1–V4 of the corresponding wheels T1–T4.

As inflation pressure of the tire provided in one wheel decreases, the diameter of the wheel is reduced and the rotational speed V1–V4 thereof increases accordingly. Therefore, a yaw rate of the front wheels T1, T2 (front-wheel yaw rate $\gamma F$) which is caused by a difference between rotational speeds V1, V2 of the front wheels T1 and T2 is compared with a yaw rate of the rear wheels T3, T4 (rear-wheel yaw rate $\gamma R$) which is caused by a difference between rotational speeds V3, V4 of the rear wheels T3, T4, and if any significant disparity is observed between the rotational speed differences, it is then determined that tire inflation pressure of any of the wheels T1–T4 has decreased. According to the present embodiment, as will be described later in detail, correction is made to an apparent yaw rate that would be observed in the properly inflated wheel as a result of steering for correction by a driver, thereby improving detection accuracy of underinflation of the tires.

Figure 2:
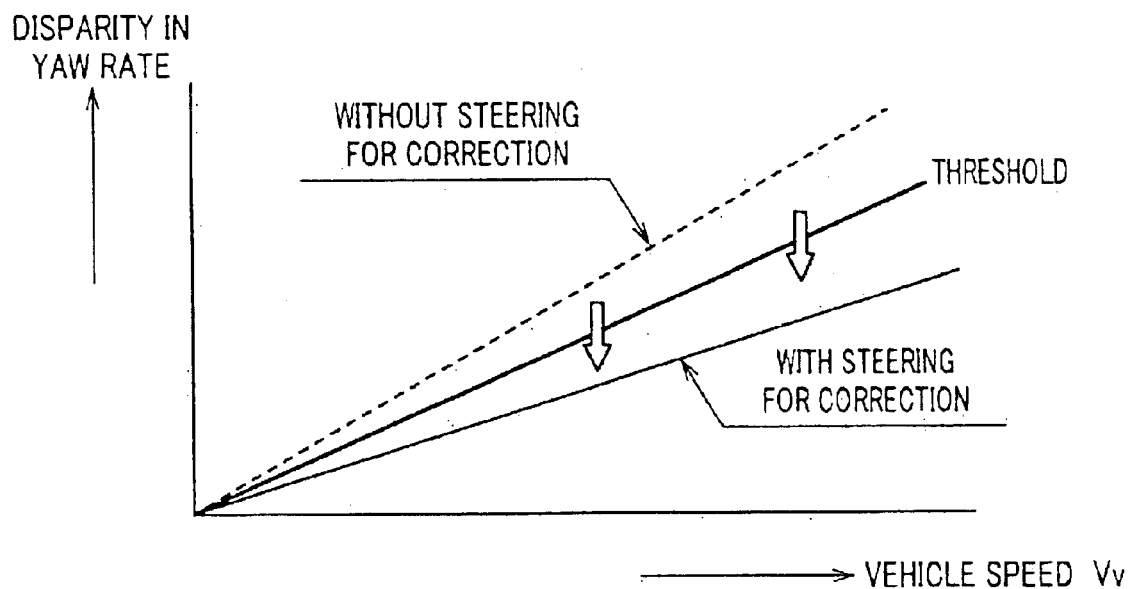
FIG. 2 is a chart for explaining the principle of detection of insufficient tire inflation pressure implemented in the underinflation detector as shown in FIG. 1.

To be more specific, assuming that a vehicle drives straight ahead on a road of rolling resistance $\mu n$, when the tire inflation pressure of the front wheel T2 decreases and the rolling resistance increases to $\mu p$, the axle shaft 3 that connects the front wheels T1, T2 with each other undergoes a front-wheel yaw rate $\gamma F$ in a clockwise direction as viewed from a top of the vehicle. The vehicle turns at a small angle in the same direction (as indicated by an arrow A) as the direction of the front-wheel yaw rate $\gamma F$, but the driver unintentionally performs steering for correction so as to force the vehicle to travel straight ahead. Accordingly, a yaw rate (rear-wheel yaw rate $\gamma R$) in a direction opposite to the front-wheel yaw rate $\gamma F$ arises in the axle shaft 4 provided between the rear wheels T3, T4. As shown in FIG. 2, the disparity (disparity in yaw rate) between the front-wheel yaw rate $\gamma F$ and the rear-wheel yaw rate $\gamma R$ exceeds a threshold if no steering for correction is performed, but the steering for correction as in the above instance would increase the rear-wheel yaw rate $\gamma R$ and thus reduce the disparity in yaw rate, with the result that the disparity in yaw rate could disadvantageously fall below the threshold. Under these circumstances, detection would possibly fail to occur regardless of underinflation. According to the present invention, as will be discussed below, correction is made to eliminate this disadvantage.

A description will now be given of an arrangement of the underinflation detector 1. In the underinflation detector 1, the rotational speeds V1–V4 of the front wheels T1, T2 and the rear wheels T3, T4 are detected by the rotational speed sensors S1–S4, and a controller 2 comprised of an electronic control unit or ECU uses the outputs of the rotational speed sensors S1–S4 to execute various processes, to determine whether inflation pressure of the tires of the wheels has decreased. The rotational speed sensors S1–S4 and the controller 2 may be implemented by making use of components available in the antilock brake system or the driving force control system for exercising traction control. To be more specific, a program for detection of insufficiency of inflation pressure is installed in the ECU of these systems to perform functions of the controller 2. It is however to be understood that a separate control unit may be provided instead as appropriate. Upon detection of insufficiency of inflation pressure of any of the tires of the wheels, the determination result is output through an instrument panel (not shown) of the vehicle, so that a driver of the vehicle is notified thereof.

Sensors of various types known in the art may be used for the rotational speed sensors S1–S4. Among sensors usable for the rotational speed sensors S1–S4, for example, is a sensor that includes a permanent magnet and an induction coil and detects magnetic flux varying between a plurality of teeth formed along a periphery of a rotor interlocked and thus revolving synchronously with an axle shaft. The teeth on the rotor are evenly spaced apart from each other with a prescribed pitch, and as the axle shaft rotates, the projecting teeth move closer to and away from the rotational speed sensor S1–S4 periodically in accordance with the rotational speed of the axle shaft. Accordingly, the magnetic flux generated by the permanent magnet also varies periodically at the same regular intervals, which produces a periodical variation of voltage directly proportional to the variation of the magnetic flux in the induction coil. In other words, the rotational speed sensors S1–S4 each output a voltage signal having a frequency according to the rotational speed of the axle shaft. It is understood that any other type of sensors may be employed for the rotational speed sensors S1–S4, such as a sensor utilizing the Hall effect, a sensor utilizing laser light, etc.

(First Embodiment)

A description will be given of a first embodiment of the underinflation detector 1 having the above-illustrated construction. This embodiment is adapted to correct an apparent yaw rate observed when a driver conducts steering for correction in response to generation of yaw rate due to underinflation of any of tires, which apparent yaw rate would disadvantageously serve to cancel the disparity in yaw rate, and the correction is made to the apparent yaw rate by retrieving a correction value, so that accurate detection of underinflation of tires can be achieved.

The controller 2 that performs operations for detection of tire underinflation as described above will now be described in detail.

Figure 3:
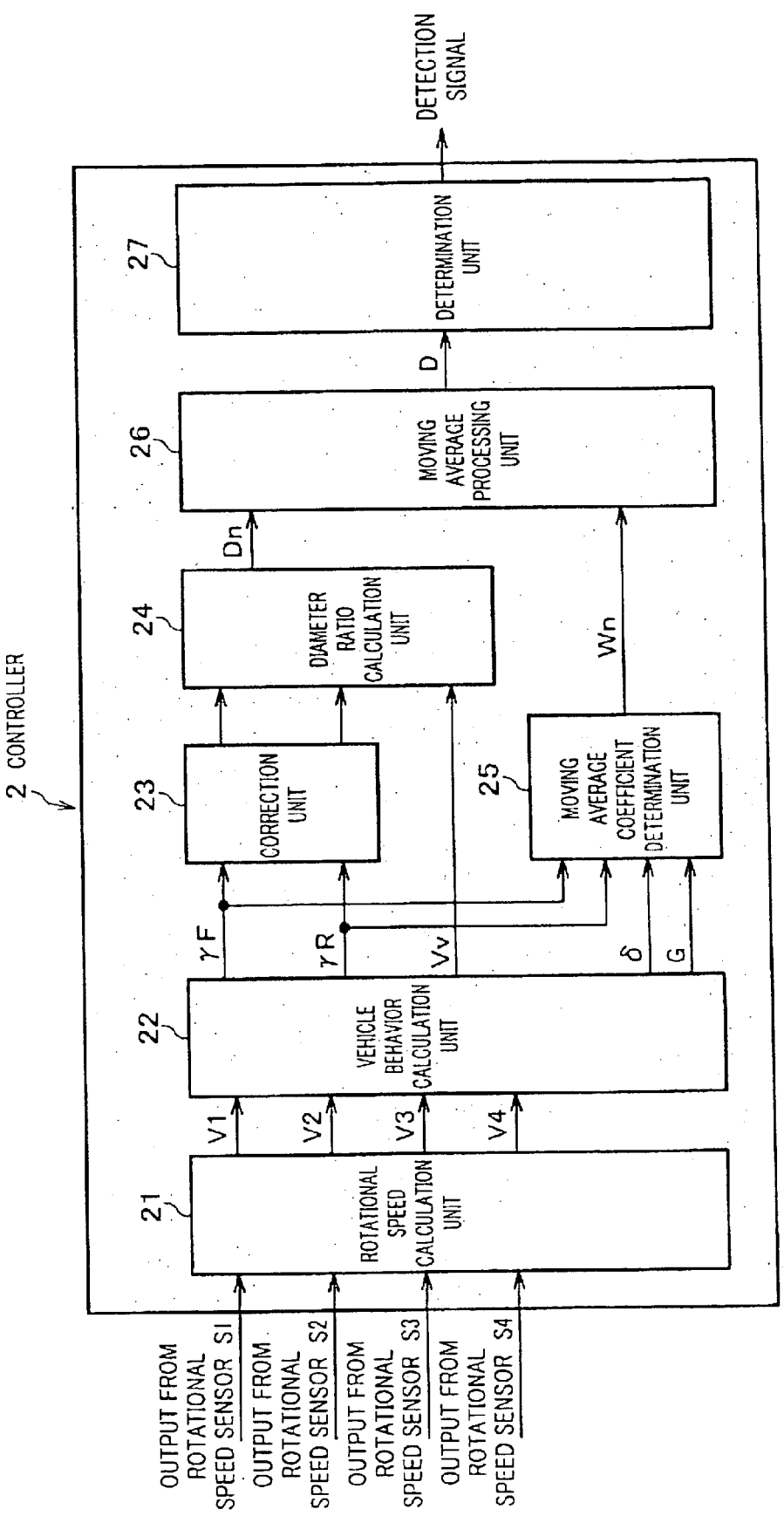
FIG. 3 is a block diagram of a controller provided in the underinflation detector as shown in FIG. 1.

The controller 2 includes a CPU, a RAM, a ROM and other necessary components, and is configured to execute various processes. Functional units related to detection of underinflation according to the present embodiment are extracted from entire functionality of the versatile controller 2 and illustrated in a block diagram of FIG. 3. As shown in FIG. 3, the controller 2 obtains outputs of the rotational speed sensors S1–S4, and calculates a front-wheel yaw rate $\gamma F$ (yaw rate for the front wheels T1, T2) and a rear-wheel yaw rate $\gamma R$ (yaw rate for the rear wheels T3, T4). The controller 2 then makes corrections to the front-wheel yaw rate $\gamma F$ and the rear-wheel yaw rate $\gamma R$ as necessary to accurately determine whether inflation pressure of tires of any of the wheels has decreased, and outputs the determination results.

To be more specific, the controller 2 includes a rotational speed calculation unit 21, a vehicle behavior calculation unit 22, a correction unit 23, a diameter ratio calculation unit 24, a moving average coefficient determination unit 25, a moving average processing unit 26, and a determination unit 27.

The rotational speed calculation unit 21 calculates rotational speeds V1, V2 of the front wheels T1, T2 and rotational speeds V3, V4 of the rear wheels T3, T4 from the outputs of the rotational speeds sensors S1–S4. The vehicle behavior calculation unit 22 calculates various parameters indicative of vehicle behavior, which parameters include a front-wheel yaw rate $\gamma F$, a rear-wheel yaw rate $\gamma R$, a vehicle speed Vv, an estimated steering angle $\delta$, and an estimated lateral acceleration G. The vehicle speed Vv takes the mean value of the rotational speeds V1–V4. The front-wheel yaw rate $\gamma F$, rear-wheel yaw rate $\gamma R$, estimated steering angle $\delta$, and estimated lateral acceleration G are obtained through a process which includes: calculating a difference between rotational speeds of the wheels T1, T2 (front-wheel speed difference) from the rotational speed V1 and the rotational speed V2 and a difference between rotational speeds of the wheels T3, T4 (rear-wheel speed difference) from the rotational speed V3 and the rotational speed V4, respectively, using a comparator; and performing an arithmetical operation such as multiplying the front-wheel speed difference by a prescribed value and the rear-wheel speed difference by another (or the same) prescribed value, respectively.

The correction unit 23 receives the front-wheel yaw rate $\gamma F$ and the rear-wheel yaw rate $\gamma R$, retrieves a correction value from a map with one of the front-wheel yaw rate $\gamma F$ and the rear-wheel yaw rate $\gamma R$, which correction value serves to cancel the effect of steering for correction performed by a driver, and makes a correction to the front-wheel yaw rate $\gamma F$ or the rear-wheel yaw rate $\gamma R$ using the correction value. This correction is to cancel a yaw rate deviation (apparent yaw rate) caused by steering for correction performed by the driver. The correction value may be obtained, for example, by retrieving a correction value C1 or C2 from a map as shown in FIG. 4. The map is prepared based upon measurements or calculations (arithmetic operations) that have been carried out in advance for each particular vehicle.

Shown in FIG. 4 is a map that provides one and the same result regardless of whether correction values are retrieved with the front-wheel yaw rate $\gamma F$ or the rear-wheel yaw rate $\gamma R$; that is, C1=C2. It is to be understood that two different maps may be provided for locating a correction value C1 with the front-wheel yaw rate $\gamma F$ and for locating a correction value C2 with the rear-wheel yaw rate $\gamma R$, with consideration given to the difference between the driving wheels and the driven wheels.

Thus-obtained correction value C1 or C2 is used to correct the front-wheel yaw rate $\gamma F$ or the rear-wheel yaw rate $\gamma R$ in a manner as illustrated in a table of FIG. 5. More specifically, in a case where the front-wheel yaw rate $\gamma F$ is used to retrieve a correction value C1 from the map, such as when underinflation of a tire of one of the front wheels T1, T2 produces a yaw rate:

(a1) if correction is made to the front wheels T1, T2, the front-wheel yaw rate $\gamma F$ is multiplied by the correction value C1, and the rear-wheel yaw rate $\gamma R$ is used as uncorrected;

(b1) if correction is made to the rear wheels T3, T4, the rear-wheel yaw rate $\gamma R$ is divided by the correction value C1, and the front-wheel yaw rate $\gamma F$ is used as uncorrected.

On the other hand, in a case where the rear-wheel yaw rate $\gamma R$ is used to retrieve a correction value C2 from the map, such as when underinflation of a tire of one of the rear wheels T3, T4 produces a yaw rate:

(c1) if correction is made to the front wheels T1, T2, the front-wheel yaw rate $\gamma F$ is divided by the correction value C2, and the rear-wheel yaw rate $\gamma R$ is used as uncorrected;

(d1) if correction is made to the rear wheels T3, T4, the rear-wheel yaw rate $\gamma R$ is multiplied by the correction value C2, and the front-wheel yaw rate $\gamma F$ is used as uncorrected.

It may be understood that (a1) and (d1) are cases where a correction is made to the yaw rate (rotational speed difference) that is evaluated as having increased due to underinflation of the tire, while (b1) and (c1) are cases where a correction is made to the yaw rate other than that which is evaluated as having increased due to underinflation of the tire. The correction values C1, C2 may be set in such a manner that the operations of multiplication and division are reversed in all cases (a1) through (d1); e.g., the front-wheel yaw rate $\gamma F$ is divided by the correction value C1 in (a1).

The diameter ratio calculation unit 24 substitutes two values of the front-wheel yaw rate $\gamma F$ and the rear-wheel yaw rate $\gamma F$ received from the correction unit 23 into Equation (1) as below, to calculate a diameter ratio Di by multiplying a rate of change of the disparity between the yaw rates with respect to change of vehicle speed by a specific coefficient C3. In Equation (1), either of the front-wheel yaw rate $\gamma F$ or the rear-wheel yaw rate $\gamma R$ is a value to which a correction has been made, as described above. The vehicle speed Vv is a mean value of the rotational speeds V1–V4 of the four wheels T1–T4, and the vehicle speed conversion coefficient C3 is a prescribed constant.

$$Di = \frac{(\gamma F - \gamma R)}{Vv} \times C3 \quad (1)$$
$$\gamma F = CF \times (V1 - V2)$$
$$\gamma R = CR \times (V3 - V4)$$

where CF and CR are prescribed constants.

The diameter ratio calculation unit 24 sums up the diameter ratios Di calculated at a series of definite times for a predetermined period with Equation (1), and outputs a resultant integral Dn. This is because the rotational speeds V1–V4 are detected at short intervals, e.g., 10 ms or so, and thus short-term transient factors due to the effect of the road conditions or the like should be eliminated. Therefore, the diameter ratios Di are summed up several times corresponding to one to a few seconds (i.e., the number of times summed up is one hundred if detection occurs at 10 ms intervals for one minute).

The moving average coefficient determination unit 25 determines a moving average coefficient Wn from parameters calculated in the above vehicle behavior calculation unit 22, i.e., front-wheel yaw rate $\gamma F$ and rear-wheel yaw rate $\gamma R$ (both uncorrected), estimated steering angle $\delta$, and estimated lateral acceleration G. The moving average coefficient determination unit 25 has a map which is looked up to locate a normalized value (or a normal; e.g., between 0 and 1) of each parameter. The parameters are converted into normalized values using the respective maps, and thus-obtained normalized values are compared with each other to set the moving average coefficient Wn at the smallest among the normalized values. The reason that the parameters are converted into normalized values is to facilitate comparison of the numbers of states with various scales. Assuming for example that the normalized value of the estimated steering angle $\delta$ is "0.2"; the normalized value of the lateral acceleration G is "0.1"; and normalized values of the other parameters are all "0.3", the smallest normalized value "0.1" is assigned to the moving average coefficient Wn. Assuming instead that the smallest normalized value is "0.7", this value "0.7" is assigned to the moving average coefficient Wn. The parameters as referenced hereupon are each indicative of a driving direction of the vehicle, and thus the moving average coefficient Wn determined by the parameters serves to indicate the behavior of the vehicle such that the larger the coefficient Wn, the more likely the vehicle is driving in the straight-ahead direction, while the smaller the coefficient Wn, the more the vehicle deviates from the straight-ahead driving direction.

The moving average calculation unit 26 determines the tendency of change of the diameter ratios Dn represented when the vehicle is steadily driving straight ahead, using the method of moving averages. The method of moving averages is one example of the processes for determining change of a state by finding a tendency of a plurality of data obtained in a time series. To be more specific, the integral Dn of the diameter ratios Di is weighted by the moving average coefficient Wn calculated in the same period of time, and the weighted diameter ratios are summed up (totalized) a prescribed number of times n (e.g., the number of times equivalent to a twenty-second period of time). The totalized value may be divided by the number of calculations (totalizations) n to take an average if circumstances could permit; in the present embodiment, however, the totalized value of the diameter ratio is output as a diameter ratio D to a subsequent process for purposes of processing speed improvement and/or memory space saving.

In the method of moving averages, for cases where the diameter ratios Dn are large, if the moving average coefficient Wn is large, then the totalized value D of the diameter ratio becomes large, while if the moving average coefficient Wn is small, then the totalized value D of the diameter ratio becomes small. For cases where the diameter ratios Dn are small, if the moving average coefficient Wn is small, then the totalized value D of the diameter ratio becomes much smaller, while if the moving average coefficient Wn is large, then the totalized value D of the diameter ratio becomes relatively large. In other words, when the moving average coefficient Wn is small, it is understood that the vehicle is not driving straight ahead, and thus change in diameter ratios Dn is modified so as not to affect the detection result much. On the other hand, when the moving average coefficient Wn is large, it is determined that the vehicle is driving nearly straight ahead, and thus detected value is weighted so that the change in diameter ratios Dn affects the detection result much. Hereupon, because plural values are summed up, even if the moving average coefficient Wn is relatively a small value, the diameter ratios Dn continuously exhibiting a specific value for a long time would affect the detection result.

The determination unit 27 outputs a detection signal indicating underinflation if the diameter ratio D output from the moving average processing unit 26 exceeds a threshold that has been stored in a memory (e.g., ROM) in advance. When such a detection signal is output, a warning light embedded in the instrument panel (not shown) is turned on, so that the driver is notified of the insufficient inflation pressure of at least any one of the tires.

Figure 6A:
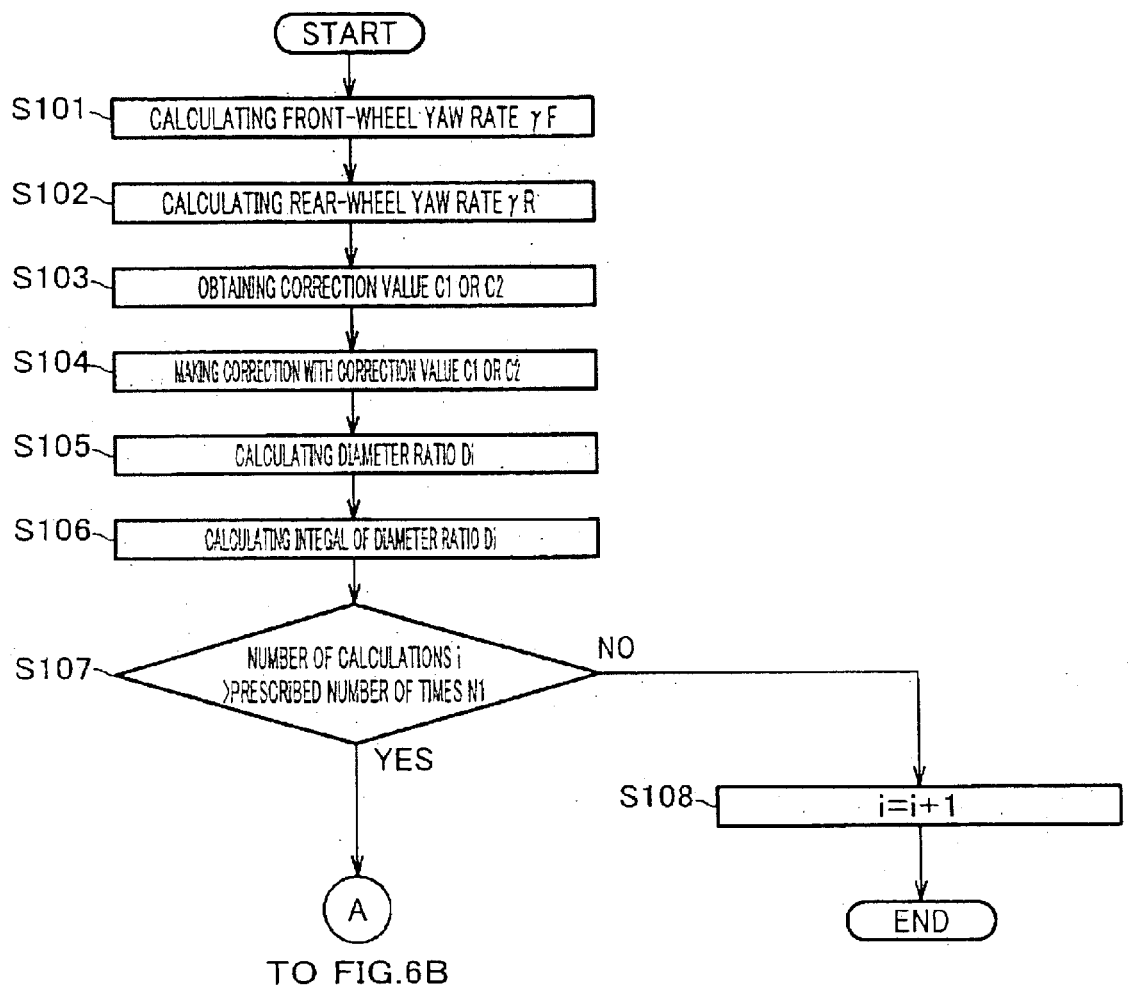
FIGS. 6A and 6B show a flowchart of process steps of detection of insufficient tire inflation pressure according to one exemplified embodiment of the present invention.
Figure 6B:
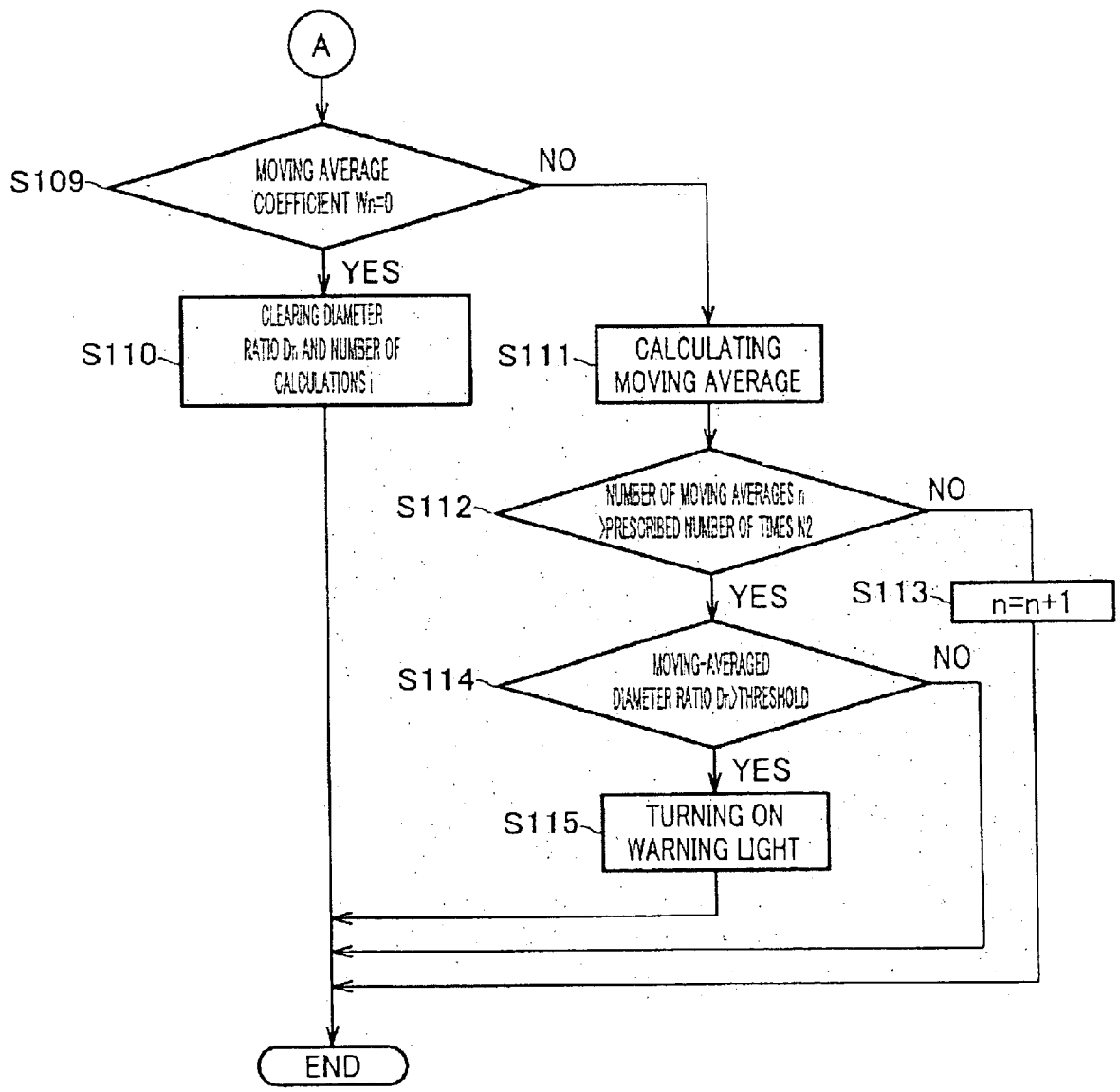

Next, a description will be given of a process flow of underinflation detection with reference to the flowchart shown in FIGS. 6A and 6B and other drawing figures.

First, a front-wheel yaw rate $\gamma F$ derived from a rotational speed difference between the front wheels T1, T2 is calculated in step S101. This process step is performed, using output signals from the rotational speed sensors S1, S2, by the rotation speed calculation unit 21 with a comparator, and vehicle behavior calculation unit 22 of the controller 2 as illustrated in FIG. 3.

In step S102, a rear-wheel yaw rate $\gamma R$ derived from a rotational speed difference between the rear wheels T3, T4 is calculated. This process step is performed, using output signals from the rotational speed sensors S3, S4, by the rotation speed calculation unit 21 with a comparator, and vehicle behavior calculation unit 22 of the controller 2 as illustrated in FIG. 3.

In step S103, a correction value to be applied to the front-wheel yaw rate $\gamma F$ or the rear-wheel yaw rate $\gamma R$ is obtained in the correction unit 23, when the larger of the yaw rates $\gamma F$, $\gamma R$ is used to correct the smaller of the yaw rates $\gamma F$, $\gamma R$, the yaw rates $\gamma F$, $\gamma R$ are compared with each other, and a correction value C1 or C2 is retrieved with the larger of the yaw rates $\gamma F$, $\gamma R$. Next, a correction is made in step S104 with the correction value C1 or C2. In this instance, any one of the aforementioned (a1) through (a4) are adopted.

In step S105, a diameter ratio Di is calculated using Equation (1) as above. The calculated diameter ratio Di is summed up in step S106 to calculate an integral Dn of the diameter ratios Di. If a previously calculated diameter ratio Di (or integral Dn of such previously calculated diameter ratios) is stored in the memory, the diameter ratio Di that has just been calculated in step S105 is added to the stored diameter ratio Di (or the integral Dn). In the initial state, no diameter ratio Di is stored in the memory, and thus if the number of times calculated i=1, then the integral Dn is equal to the diameter ratio Di.

Subsequently in step S107, it is determined whether the number of times calculated (the number of calculations) i is more than the prescribed number of times N1. The prescribed number of times N1 is a relatively large integer (e.g., 100) as described above. At this initial calculation stage, the number of calculations i=1, and therefore the determination results in NO. Accordingly, the number of calculations i is incremented by one in step S108, and then the process goes to an end. When a predetermined period of time (e.g., 10 ms) has passed after the calculation, the process from step S101 starts again, and the process steps S101 through 107 are repeated at prescribed intervals of time (e.g., every 10 ms) until the condition in step S107 is satisfied, i.e., unless the number of calculations i exceeds the prescribed number of times N1. Meanwhile, the currently calculated diameter ratio Di is added to the integrated diameter ratio Dn stored in the memory, and the result of addition is stored into the memory. For example, the integrated diameter ratio Dn obtained when the number of calculations i=3 is the sum of the first, second and third calculation results of the diameter ratios Di.

If it is determined in step S107 that the number of calculations i exceeds the prescribed number of times N1 (YES), then the process goes to step S109, in which the moving average coefficient Wn is checked and if Wn=0 (YES), then the process, goes to step S110. In step S110, the diameter ratio Dn stored in the memory and the number of calculations i (a counter thereof) are cleared and the process goes to an end. This is because the moving average should not be calculated (i.e., the diameter ratio should not be used) when the moving average coefficient Wn is equal to "0" (zero) which indicates the vehicle is not in a stable condition for traveling straight ahead.

On the other hand, if it is determined in step S109 that the moving average coefficient Wn is not equal to "0"(zero) (NO), then the process goes to step S111 in which a moving average is calculated. The moving average is calculated by multiplying the current moving average coefficient by the diameter ratio Dn (Wn×Dn) at prescribed intervals until the number of times n of moving averages exceeds a prescribed number of time N2, and calculating the sum thereof. For example, if the number of times n of moving averages=3, the moving average is calculated by summing up the product (W1×D1) obtained when the number of times n of moving averages=1, the product (W2×D2) obtained when the number of times n of moving averages=2 and the product (W3×D3) obtained when the number of times n of moving averages=3.

The moving average processing is performed until the number of times n of moving averages exceeds the prescribed number of times N2 as shown in step S112, and if the number of times n of moving averages does not exceed the prescribed number of times N2 (NO), then the process goes to step S113, in which the number of times n of moving averages is incremented by one and the process is terminated temporarily. After a predetermined period of time has passed, the process starts again from step S101, and is carried out repeatedly.

If it is determined in step S112 that the number of times n of moving averages exceeds the prescribed number of times N2 (YES), the process goes to step S114 in which the diameter ratio D that is subjected to the moving average processing is compared with a threshold. If it is determined in step S114 that the diameter ratio D exceeds the threshold, then it is determined that underinflation has taken place, and a signal for indicating the underinflation is output. Then, in step S115, a warning light is turned on and the process goes to an end. On the other hand, if it is determined in step S114 that the diameter ratio D is less than the threshold, then it is determined that no underinflation has taken place, and thus the process goes to an end without further action.

Subsequently, after a predetermined period of time has passed, the process starts again from step S101, and the yaw rates $\gamma F$, $\gamma R$ are calculated, summed up and subjected to the moving average processing until the number of times n of moving averages reaches the prescribed number of times N1. At this stage, the number of times n of moving averages has already exceeded the prescribed number of times N2, and thus the previously calculated diameter ratio D is added to the newly calculated diameter ratio Dn based upon the yaw rates $\gamma F$, $\gamma R$ to calculate a new diameter ratio D. Based upon the newly calculated diameter ratio D, it is determined whether the tire inflation pressure has decreased.

As described above, with the underinflation detector according to the present embodiment, if any of the front wheels T1, T2 and rear wheels T3, T4 of the vehicle that is steadily traveling straight ahead is underinflated and a difference arises in rotational speed between the front wheels T1, T2 or between the rear wheels T3, T4, then detection of underinflation can occur without fail even when the driver performs steering for correction so as to cancel the yaw rate arising due to underinflation of the tire.

(Second Embodiment)

When tire inflation pressure of a wheel decreases, a contact area of the tire on the road increases, and the rolling resistance increases accordingly. In this instance, imbalance (i.e., yaw moment) equivalent to the increment of the rolling resistance occurs between a stress applied to the left wheel and a stress applied to the right wheel of the same axle shaft. In the present embodiment, consideration is focused on the yaw moment, and a yaw rate equivalent to the increment of the rolling resistance is calculated for use in correction. Hereupon, it is understood that arrangements of the underinflation detector 1 and the controller 2 are similar to those in the above embodiment, and thus a duplicate description of the components and processing will be omitted.

The correction unit 23 shown in FIG. 3 uses Equation 2 as below in the present embodiment, instead of using a map as in the first embodiment, to correct the front-wheel yaw rate γF and the rear-wheel yaw rate γR.

$$M\gamma = C4 \times (\mu p \times wp - \mu n \times wn)/(Lt/2)$$

$$\gamma P = \Sigma(M\gamma \times t) \quad (2)$$

In Equation (2), Mγ is a yaw moment equivalent to the increment of rolling resistance, C4 is a yaw inertial coefficient (180/π/yaw inertial moment). μn and μp are rolling resistances exhibited in proper inflation pressure and in insufficient inflation pressure, respectively wn and wp are wheel loads exhibited in proper inflation pressure and in insufficient inflation pressure, respectively. Lt is a tread length of the front wheels T1, T2 when a calculation is made for the front wheels T1, T2, or of the rear wheels T3, T4 when a calculation is made for the rear wheels T3, T4. These data have been calculated in advance, and stored in a memory allocated for the correction unit 23. t is an interval of time at which rotational speeds V1–V4 of the wheels T1–T4 are measured. It is understood that the vehicle may include a road resistance detection system and a load sensor, so that the rolling resistances μn, μp and loads wn, wp may be obtained from the road resistance detection system and the load sensor.

Thus-obtained yaw rate deviation γP as a correction value is used for addition or subtraction to or from the front-wheel yaw rate γF or the rear-wheel yaw rate γR in a manner as illustrated in a table of FIG. 7. More specifically, in a case where the yaw rate deviation γP (γP1) for the front wheels T1, T2 is calculated, such as when underinflation of a tire of one of the front wheels T1, T2 produces a yaw rate:

(a2) if correction is made to the front wheels T1, T2, the yaw rate deviation γP1 is subtracted from the front-wheel yaw rate γF, and the rear-wheel yaw rate γR is used as uncorrected;

(b2) if correction is made to the rear wheels T3, T4, the yaw rate deviation γP1 is added to the rear-wheel yaw rate γR, and the front-wheel yaw rate γF is used as uncorrected.

On the other hand, in a case where the yaw rate deviation γP (γP2) for the rear wheels T3, T4 is calculated, such as when underinflation of a tire of one of the rear wheels T3, T4 produces a yaw rate:

(c2) if correction is made to the front wheels T1, T2, the yaw rate deviation γP2 is added to the front-wheel yaw rate γF, and the rear-wheel yaw rate γR is used as uncorrected;

(d2) if correction is made to the rear wheels T3, T4, the yaw rate deviation γP2 is subtracted from the rear-wheel yaw rate γR, and the front-wheel yaw rate γF is used as uncorrected.

It may be understood that (a2) and (d2) are cases where a correction is made to the yaw rate (rotational speed difference) that is evaluated as having increased due to underinflation of the tire, while (b2) and (c2) are cases where a correction is made to the yaw rate other than that which is evaluated as having increased due to underinflation of the tire.

A process flow of underinflation detection implemented in the present embodiment of the underinflation detector 1 is identical to that for the first embodiment as discussed above with reference to FIGS. 6A and 6B, except: the calculation of correction values C1, C2 in step S103 should be substituted with the calculation of yaw rate deviation γP (γP1 or γP2); and correction using one of the above (a1)–(d1) in step S104 should be substituted with the calculation using one of the above (a2)–(d2).

As described above, with the underinflation detector according to the present embodiment, like the first embodiment, if any of the wheels T1–T4 of the vehicle that is steadily traveling straight ahead is underinflated and a difference arises in rotational speed between the front wheels T1, T2 or between the rear wheels T3, T4, then detection of underinflation can occur without fail even when the driver performs steering for correction so as to cancel the yaw rate arising due to underinflation of the tire.

Although the preferred embodiments of the present invention have been described above, various modifications and changes may be made in the present invention without departing from the spirit and scope thereof. For example, the underinflation detector according to the present invention may include sensors capable of detecting parameters for determining a moving average coefficient Wn, and in such an alternative embodiment, each parameter may be determined without using rotational speeds V1–V4 of the wheels T1–T4 of the vehicle.

Moreover, the parameters available in the present invention may include a vehicle speed, acceleration, engine torque, engine rpm, gearshift position, and the like. These parameters serve to determine if the vehicle speed falls within a steady-state range, and can thereby determine the behavior, other than the direction of movement, such as an acceleration state, of the vehicle. Not every parameter as mentioned above need be employed. Two or more of parameters of different kinds may be employed in combination such that a parameter indicating a direction of movement of the vehicle and another parameter indicating an acceleration condition can be obtained to determine two separate moving average coefficients Wn, which may both be used to weight diameter ratios Dn in the moving average processing unit 26.

The integrated diameter ratio Dn of the diameter ratios Di used in the diameter ratio calculation unit 24, and the integrated diameter ratio D weighted by the moving average coefficient Wn obtained in the moving average processing unit 26 each may be a value divided by the number of calculations i and the number of times of moving averages n, respectively.

According to the present invention, when a parameter is calculated from a disparity between a front-wheel rotational speed difference and a rear-wheel rotational speed difference, correction is made to the parameter by canceling a deviation of one of the front-wheel rotational speed difference and the rear-wheel rotational speed difference caused by a steering operation which a driver performs so as to cancel the other of the front-wheel rotational speed difference and the rear-wheel rotational speed difference arising due to underinflation of the tire. Therefore, insufficient inflation pressure of tires can be detected with improved reliability.

What is claimed is:

1. An underinflation detector for a four-wheeled vehicle comprising:

a rotational speed sensor to detect rotational speeds of two front wheels and two rear wheels of the vehicle; and a controller to determine that inflation pressure of a tire of any of the wheels has decreased, if a parameter calculated from outputs of the rotational speed sensor exceeds a threshold, wherein a first value of the parameter is calculated using a disparity between a front-wheel rotational speed difference and a rear-wheel rotational speed difference; and wherein correction is made to the first value of the parameter to obtain a second value of the parameter to be compared with the threshold by canceling a deviation of one of the front-wheel rotational speed difference and the rear-wheel rotational speed difference caused by a steering operation which a driver performs so as to cancel the other of the front-wheel rotational speed difference and the rear-wheel rotational speed difference arising due to underinflation of the tire.

2. An underinflation detector according to claim 1, wherein the correction to the first value of the parameter is made by retrieving a correction value from a map with a yaw rate calculated from the rotational speed difference arising due to the underinflation of the tire, and multiplying the yaw rate by the correction value.

3. An underinflation detector according to claim 1, wherein the correction to the first value of the parameter is made by retrieving a correction value from a map with a first yaw rate calculated from the rotational speed difference arising due to the underinflation of the tire, and dividing a second yaw rate calculated from the rotational speed difference caused by the steering operation by the correction value.

4. An underinflation detector according to claim 1, wherein the correction to the first value of the parameter is made by calculating a yaw moment acting on one of a front axle shaft and a rear axle shaft with an increase of a rolling resistance arising due to the underinflation of the tire, obtaining from the yaw moment a yaw rate deviation corresponding to the increase of the rolling resistance, and subtracting the yaw rate deviation from a yaw rate calculated from the rotational speed difference arising due to the underinflation of the tire.

5. An underinflation detector according to claim 1, wherein the correction to the first value of the parameter is made by calculating a yaw moment acting on one of a front axle shaft and a rear axle shaft with an increase of a rolling resistance arising due to the underinflation of the tire, obtaining from the yaw moment a yaw rate deviation corresponding to the increase of the rolling resistance, and adding the yaw rate deviation to a yaw rate calculated from the rotational speed difference caused by the steering operation.

6. An underinflation detector according to claim 1, wherein a wheel diameter ratio is calculated from the first value of the parameter to which the correction has been made; and wherein the second value of the parameter to be compared with the threshold is obtained by multiplying the wheel diameter ratio by normalized values indicating a straight-ahead driving direction of the vehicle, and taking moving averages thereof.

* * * * *